United States Patent [19]

Van Fisk, Jr.

[11] 4,359,339
[45] Nov. 16, 1982

[54] BENTONITE CLAY AND WATER SOLUBLE ALUMINUM SALT COMPOSITIONS

[75] Inventor: James Van Fisk, Jr., Houston, Tex.

[73] Assignee: NL Industries, Inc., New York, N.Y.

[21] Appl. No.: 312,213

[22] Filed: Oct. 19, 1981

Related U.S. Application Data

[63] Continuation of Ser. No. 217,471, Dec. 16, 1980, abandoned, which is a continuation of Ser. No. 35,698, May 3, 1979, abandoned.

[51] Int. Cl.$^3$ ................................................ B28B 7/34
[52] U.S. Cl. .................................. 106/38.3; 106/38.35; 106/38.9; 501/127
[58] Field of Search .................... 106/38.3, 38.35, 38.9; 501/127

[56] References Cited

U.S. PATENT DOCUMENTS

| | | | |
|---|---|---|---|
| 2,237,593 | 4/1941 | Dunbeck | 106/38.9 |
| 2,956,893 | 10/1960 | Houston et al. | 106/67 |
| 3,027,322 | 3/1962 | Stuchell et al. | 252/8.55 |
| 3,027,323 | 3/1962 | Stuchell et al. | 252/8.5 |
| 3,445,252 | 5/1969 | Nevins | 106/38.9 |
| 4,001,029 | 1/1977 | Cassens | 106/38.9 |
| 4,131,476 | 12/1978 | Melcher et al. | 106/38.35 |
| 4,137,085 | 1/1979 | Matsui | 106/38.35 |

FOREIGN PATENT DOCUMENTS

| | | | |
|---|---|---|---|
| 568621 | 4/1945 | United Kingdom | 106/38.9 |

*Primary Examiner*—Lorenzo B. Hayes

[57] ABSTRACT

Bentonite clay and water soluble aluminum salt compositions are provided which are useful in replacing the binding clay in foundry sand molds which has been deactivated by molten metal cast in the molds. Aluminum sulfate is the preferred aluminum salt.

The clay and aluminum salt are applied in making pumpable slurries for foundry sand make-up applications containing up to 26% by weight of clay and sufficient aluminum salt to provide a weight ratio of clay to aluminum salt of from 1/1 to 99/1. Sand mixes containing the clay and aluminum salt are also provided characterized by increased hot strengths over sand mixes containing no aluminum salt.

3 Claims, No Drawings

BENTONITE CLAY AND WATER SOLUBLE ALUMINUM SALT COMPOSITIONS

This is a continuation, of application Ser. No. 217,471, filed Dec. 16, 1980 now abandoned, which is a continuation of application Ser. No. 35,698, filed May 3, 1979, now abandoned.

BACKGROUND OF THE INVENTION

This invention is concerned with bentonite clay and water-soluble aluminum salt compositions which are useful in replacing the binding clay in foundry sand molds which has been deactivated by molten metal poured into the mold.

In foundry operations, the sand molds used to form the metal products cast therein may contain a clay material such as benonite clay, either alone or also containing carbonaceous additives, which acts as a binder for the sand. After casting hot metal in the sand mold, a portion of the clay contained therein is deactivated along with some additives and must be replaced. To replace the deactivated material, an aqueous slurry of fresh bentonite clay is prepared, with approriate additives as required, and pumped to a muller, wherein it is combined with foundry sand and mulled. This sand and clay mull is then rammed into a mold. Presently, the clay content of the slurries used to replace clay in sand molds is from about 8% to 11% by weight. At less than about 8%, the gel strengths of the slurries are too low to hold the additives in suspension. At greater than 11% by weight the viscosities of the slurries are so high that they can hardly be pumped by conventional equipement. However, with foundries pouring a large quantity of metal into the sand mold, clay quantities greater than those existing in the normal slurry make-up are required. Thus there is a need for slurries containing greater than 11% by weight of clay which have viscosities low enough to allow pumping. In addition, since control of water is critical in a foundry sand mix, the more clay which can be incorporated into the slurry, the better the foundry can regulate the moisture content in the sand without having to consider the loss or overaddition of clay.

It is known in the art that certain colloidal sodium and potassium aluminum silicates such as bentonite clay undergo swelling of the clay lattice structure by polar molecules such as water. This phenomenon is discussed more fully in the treatise, "Clay Minerology", 7th Edition by R. Grim, (McGraw-Hill). Water, by virtue of its doplar character, according to Grim, will orient itself first positive to negative with respect to the charged surfaces of the clay lattice and then with itself, forming layers of a crystalline-like substance similar to the mechanism of forming ice crystals. This mechanism accounts for the ability of such clays to thicken polar media into which they are incorporated. A depression or interruption of this arrangement will serve to consequently lower the viscosity of the media.

It has been found that water-soluble aluminum salts such as aluminum sulfate disrupts the formation of the crystlline-type water arrangement that causes the clay to expand as the water lattice grows. This disruption decreases the thickness of the absorbed water layer in the clay molecule and thus the clay will not swell as much as normal when hydrated.

Consequently the viscosities and gel strengths of aqueous media containing the clay and aluminum salt are reduced. Therefore high concentrations of clay slurries, e.g., greater than 11% by weight, can be prepared and easily pumped by conventional equipment for foundry applications. Foundries employing such clay slurries for make-up purposes can also regulate moisture more easily without undue concern over clay additions to the sand. Moreover, the aluminum salt in the clay does not substantially affect the binding properties of the clay. Other cations, such as calcium and magnesium cation on the other hand are high enough in activity to replace sodium if in sufficient concentration, consequently adversly affecting the clay binding properties. Additions of small amounts of water to a sand mix containing a bentonite clay and water-soluble aluminum salt will dilute the aluminum salt and the sand mix will retain its original properties.

In the case of a calcium compound on the other hand, although a decrease in the swelling of the clay is achieved, calcium ion will exchange with sodium in the clay creating a calcium bentonite which will not redisperse on dilution and the mix will experience a change in physical properties.

The present invention makes use of the properties of water-soluble aluminum salts as viscosity depressants for bentonite clays by providing compositions of clay and water-soluble aluminum salts useful in making pumpable slurries for mulling with foundry sands which are used to replace the deactivated clay in sand molds. The slurries can contain greater than 11% by weight of clay and up to about 26% by weight and yet have sufficient low viscosities to be easily pumped and have sufficient gel strengths to maintain solids in dispersion.

SUMMARY OF THE INVENTION

In one embodiment of this invention a dry blend of bentonite clay and water-soluble aluminum salt is provided which can be added to water or a mixture of sand and water and mulled with foundry sand to form a sand mix which is then hot-rammed into a sand mold.

In a second embodiment of this invention, pumpable water slurries of clay and water-soluble aluminum salts are provided containing from about 14% to 26% by weight of clay and which exhibit no adverse change in the sand binding properties of the clay.

In a third embodiment of this invention, pumpable water slurries of clay and water-soluble aluminum salts, including additivs such as solubilized lignite and a ground coal, are provided containing from about 14% to 26% by weight of clay and which exhibit no adverse change in the sand binding properties of the clay.

In a fourth embodiment of this invention, sand mixes containing clay and aluminim salt are provided. Such sand mixes show an increase in dry strength properties which is attributed to the ability of the aluminum salt to inhibit swelling of the clay. Dry strengths are a function of the swelling and dispersion characteristics of the clay. A low swelling but dispersive clay will promote coating of the sand grains and close arrangement of the sand grains with each other on hot-ramming. A swelling depressant such as the present aluminum salt acts to increase the dry strengths of sand and clay mixes in which it is incorporated.

DETAILED DESCRIPTION OF THE PREFERRED EMBODIMENTS

The water soluble aluminum salts of this invention include aluminum sulfate, aluminum acetate, aluminum nitrate, or any other aluminum salt having substantial solubility in water. Said aluminum salts or this invention preferably exhibit a pH of between about 4 and 10 in water. pH's above and below the range may effect the physical properties of the clay. The aluminum sulfate may be hydrated or anhydrous. Technical grade aluminum sulfate, $$Al_2(SO_4)_3 \cdot 18H_2O$$

is conveniently employed.

The bentonite clays of this invention include sodium bentonites derived from the western regions of the United States and sodium bentonite clay containing products containing up to about 50% by weight of bentonite with the remainder being carbonaceous additives, such as coal, lignite, and solubilized lignite.

Solublilized lignite comprises ground lignite treated with aqueous caustic solutions. Such caustic treatment results in solubilizing Humic Acid components of the lignite. Such solubilized lignites and methods for preparation are further described in U.S. Pat. No. 3,027,323 and U.S. Pat. No. 3,027,322.

Bentonite clay slurries are prepared according to this invention by two methods. In one method, dry blends of aluminum sulfate and clay are prepared and then added to water by mixing. Alternatively, the aluminum salt and clay are each separately added to water to form the slurry. Preferably, the aluminum salt is added first to water, stirred for a minimum of five minutes and then the clay is added.

It has been found that slurries containing from about 14% to 26% by weight of clay can be prepared using aluminum sulfate as a swelling depressant therewith, which slurries are of sufficiently low viscosity to be pumpable by conventional equipment. Generally, the amount of aluminum salt used with the clay either in the dry blend or direct slurry method is sufficient to provide a weight ratio of clay to aluminum salt of from about 1/1 to 99/1, preferably about 2/1 to 30/1.

Typically, Brookfield viscosities of slurries prepared according to this invention range from a minimum of 80 cps for a 15% clay slurry containing 7.5% aluminum sulfate to a maximum of 4400 cps for a 15% clay slurry containing about 0.5% aluminum sulfate (Room temperature, 50 r.p.m. using a No. 3 spindle). Maximum gel strengths in lb./100 ft.² were obtained for a 20% clay slurry containing 0.75% aluminum sulfate.

Foundry sand mixes comprising sand, bentonite clay and aluminum salt containing about 6% bentonite clay and from 0.75% to 1% aluminum sulfate showed an increase in dry compression strengths and hot strengths as compared to a similar foundry sand mix containing no aluminum salt.

In order to more fully describe the present invention the following examples are given.

EXAMPLES 1 to 15

These Examples illustrate the preparation of water slurries containing various amounts of sodium bentonite clay and aluminum sulfate and the resulting viscosities and gel strengths of the slurries so produced.

In all Examples, dry blends of 200 mesh sodium bentonite clay containing from about 6% to about 10% water having a liquid limit number about 700 and technical grade aluminum sulfate $$Al_2(SO_4)_3 \cdot 18H_2O$$

were prepared by placing the clay and aluminum sulfate in a one liter plastic bottle and mixing the so-formed dry blend thirty minutes on a gyroshaker. Next a slurry was prepared by adding the dry blend to water in a lab Model "F" LIGHTNIN$^R$ mixer and stirring the mixture at 300 r.p.m. for about 20 minutes. Thereafter, 200 ml. of each slurry was poured into a 250 ml. beaker and the viscosity measured at room temperature using a Brookfield RVT model viscometer set at 50 r.p.m. using a No. 3 spindle. The viscometer was allowed to run two minutes after placing the spindle in the slurry before a reading was taken. In addition, measurements of gel strengths on several samples were taken after 10 minutes and 12 hours using a BAROID ® Fan Rheometer at 30 r.p.m. As a control, an 8% slurry of benonite clay was measured for viscosity and gel strengths. The results are summarized in Table 1 below.

TABLE 1

| | Slurry Components | | | | | Dry Blend | Brookfield | Gel Strength (lb./100 ft.²) | |
|---|---|---|---|---|---|---|---|---|---|
| Example | Clay (g) | H₂O (g) | Al₂(SO₄)₃ (g) | Clay (%) | Al₂(SO₄)₃ (%) | % Clay/ % Al₂(SO₄)₃ | Viscosity (cps) | after 10 min. | after 12 hrs. |
| 1 | 58.25 | 340.0 | 1.747 | 14.56 | 0.456 | 97/3 | 4400 | — | — |
| 2 | 58.04 | 339.0 | 3.390 | 14.51 | 0.849 | 94/6 | 760 | — | — |
| 3 | 60.00 | 337.0 | 3.000 | 15.00 | 0.750 | 95/5 | 700 | 40 | — |
| 4 | 60.00 | 334.5 | 5.452 | 15.00 | 1.363 | 92/8 | 320 | — | — |
| 5 | 60.00 | 330 | 10.000 | 15.00 | 2.500 | 86/14 | 460 | — | — |
| 6 | 60.00 | 310.0 | 30.00 | 15.00 | 7.500 | 67/33 | 80 | — | — |
| 7 | 64.00 | 333.0 | 3.000 | 16.00 | 0.750 | 95/5 | 1000 | 45 | — |
| 8 | 68.00 | 328.0 | 3.840 | 17.00 | 0.960 | 95/5 | 700 | 50 | — |
| 9 | 72.00 | 325.0 | 3.000 | 18.00 | 0.750 | 96/4 | 1300 | 45 | — |
| 10 | 100.00 | 396.0 | 3.650 | 20.00 | 0.750 | 96/4 | 1630 | 55 | 85 |
| 11 | 100.00 | 395.0 | 5.005 | 20.00 | 1.001 | 95/5 | 1600 | 55 | 85 |
| 12 | 100.00 | 394.0 | 6.000 | 20.00 | 1.200 | 94/6 | 1440 | 50 | — |
| 13 | 100.00 | 393.0 | 7.000 | 20.00 | 1.400 | 93/7 | 1240 | 55 | — |
| 14 | 100.00 | 392.0 | 8.000 | 20.00 | 1.600 | 92/8 | 1300 | — | — |
| 15 | 100.00 | 388.0 | 12.000 | 20.00 | 2.400 | 90/10 | 600 | 45 | 43 |
| Control | 32.00 | 368.0 | — | 8.00 | — | — | 1590 | 115 | 210 |

As Table 1 shows, in general the viscosities of the clay slurries containing aluminum sulfate are significantly less than the control even at higher clay contents than the control provided the aluminum sulfate is above about 0.5% of the slurry. In Examples 10 and 11, the viscosities were slightly greater than the control but the clay content therein was over 2½ times the clay content of the control. Gel strengths, were obtained, did not exceed 85 lbs./100 ft.² which is dramatically less than the control which has a gel strength of 210 lbs./100 ft.²

EXAMPLES 16 and 17

In these Examples, two foundry sand mixes were prepared to show the effect of different amounts of aluminum sulfate at the same clay level on the physical properties of the sand mixes.

Each sand mix was prepared by first dry mulling 2,820 g. of Oklahoma No. 1 sand (30-90 rain fineness No.) and 180 g. of sodium bentonite in an 18 inch Simpson Muller for two minutes. Thereafter 75 g. of water containing 1% aluminum sulfate, as $$Al_2(SO_4)_3 \cdot 18H_2O,$$

(Ex. 16) was added to one dry mix and 75 g. of water containing 0.75 g. aluminum sulfate, as $Al_2(SO_4)_3 \cdot 18H_2O$, (Ex. 17) was added to the other dry mix. Each was mulled for 10 minutes.

As a control, a sand mix was prepared using the above procedure without the addition of aluminum sulfate.

All samples were subjected to measurements for Green Compression Strength, Green Shear Strength, Hot Strength, Dry Compression, Moldablity Index, % Compactability and % Moisture. All tests were conducted according to the procedures outlined in Foundry Sand Handbook, 7th Edition. The results are summarized in Table 2 below.

TABLE 2

| TEST | Control | Examples 4 | 5 |
|---|---|---|---|
| Green Compression (p.s.i.) | 8.8 | 10.3 | 11.6 |
| Green Shear (p.s.i.) | 3.4 | — | 3.8 |
| Hot Strenght at 1500° F., (psi) | 640 | 510 | 620 |
| Dry Compression (p.s.i.) | 145 | 159 | — |
| Moldability Index | 10 | 5 | 7 |
| % Compactability | 60 | 60 | 60 |
| % Moisture | 3.3 | 3.2 | 3.2 |

As Table 2 shows, the properties of sand mixes containing aluminum sulfate were not appreciably different from a mix containing no additive at all for the same moisture content. In the case of compactability there was no change.

EXAMPLES 18 and 19

These Examples illustrate the effect of an addition of one percent aluminum sulfate to an aqueous slurry of a binder product containing about 50% by weight of western sodium bentonite clay and the remainder containing a mixture of solubilized lignite and coal (Baronite ® binder- N. L. Industries, Inc.).

For each Example, about 1 part by weight of aluminum sulfte was dissolved in 75 parts by weight of water. In Example 18, 24 parts by weight of the binder product was added to the aluminum sulfate solution and mixed for 10 minutes at medium speed in a Hamilton Beach ® mixer to form a 24% clay slurry. In Example 19, 26.4 parts by weight of the binder product was added to the aluminum sulfate solution under the same conditions. As a control, a 24% and 26% slurry of the binder products was preapred containing no aluminum sulfate. The viscosities in all samples were measured at room temperature using a Brookfield Viscometer at 50 r.p.m., No. 3) spindle. The results are summarized in Table 3 below.

TABLE 3

| Example | Binder Product in Slurry | % Aluminum Sulfate in Slurry | Brookfield Viscosity (cps) |
|---|---|---|---|
| 18 | 24% | 1% | 100 |
| Control | 24% | — | 420 |
| 19 | 26% | 1% | 190 |
| Control | 26% | — | 1320 |

Table 3 shows a dramatic reduction in the viscosities of the binder product containnig 1% aluminum sulfate.

EXAMPLE 20

In this Example a sand mix containing 8% of the binder product of Examples 18 and 19 and 1% aluminum sulfate was tested for the physical properties as outlined in Examples 16 and 17.

The binder product and sand (Oklahoma No. 1 sand) were first mulled together for 2 minutes. Sufficient temper water to wet the sand to about 4% mositure was added containing the aluminum sulfate necessary to yield 1% of the mixture, after which all components were mulled for 10 minutes.

All measurements were taken in accordance with the procedures outlined in Foundry Sand Handbook, 7th Edition. As a control, a sand binder mixture containing no aluminum sulfate was also tested. Table 4 summarizes the results.

TABLE 4

| TEST | Example 20 | Control |
|---|---|---|
| % Moisture | 4.0 | 3.3 |
| Green Compression p.s.i. | 9.6 | 14.3 |
| Green Shear p.s.i. | 3.2 | 4.2 |
| Dry Compression p.s.i. | 83 | 65 |
| Hot Strenght at 1500° F., p.s.i. | 320 | 400 |

EXAMPLES 21 to 23

Comparative Examples

These Examples illustrate the effects on the physical properties of a 6% western sodium bentonite sand mixture also containing various amounts of a calcium compound, calcium hydroxide, and are not illustrative of the present invention.

To the mixture containing 94% sand, 6% western bentonite, calcium hydroxide containing temper water was added in an amount equivalent to 2.5 wt. % of said mixture. Calcium hydroxide at levels of 0.35 wt. % (Ex. 21) 3.33 wt. % (Ex. 22) and 4.17 wt. % (Ex. 23) of bentonite was present in the temper water added and mulled with said sand mixture for 10 minutes. Table 5 summarizes the results.

TABLE 5

| TEST | Example 21 | 22 | 23 |
|---|---|---|---|
| % Moisture | 2.3 | 2.4 | 2.4 |
| Green Compression | 13.9 | 14.5 | 19.0 |
| Dry Compression | 116 | 112 | 54 |
| Hot Strength at 1500° F. | 500 | 410 | 200 |
| % Compactability | 60 | 60 | 59 |
| Moldability Index | 21 | 20 | 56 |

As the Table shows, increasing the calcium content acts to lower both the Hot Strength and Dry Compression Strength of sand mixes.

I claim:

1. A method for producing a foundry sand mixture suitable for use in making sand molds comprising;
   (a) preparing a pumpable binder clay slurry consisting of a mixture of sodium bentonite clay, a viscosity depressing amount of water-soluble aluminum salt selected from the group consisting of hydrated and unhydrated aluminum sulfate, aluminum acetate, aluminum nitrate and mixtures thereof, and water which contains about 11 to 26 weight percent sodium bentonite clay and a weight ratio of clay to aluminum salt of from 1/1 to 99/1 ; and
   (b) mulling said binder clay slurry with foundry sand to form said foundry sand mixture.

2. The method of claim 1 wherein the weight ratio of said clay to said aluminum salt is in the range of about 2/1 to about 30/1 respectively and wherein said slurry contains about 14 to 26 weight percent of said clay.

3. The method of claim 2 wherein said slurry contains a carbonaceous additive selected from the group consisting of coal, lignite, solubilized lignite and mixtures thereof in a weight ratio of carbonaceous additive to said clay up to about 1/1.

* * * * *